United States Patent Office 2,704,703
Patented Mar. 22, 1955

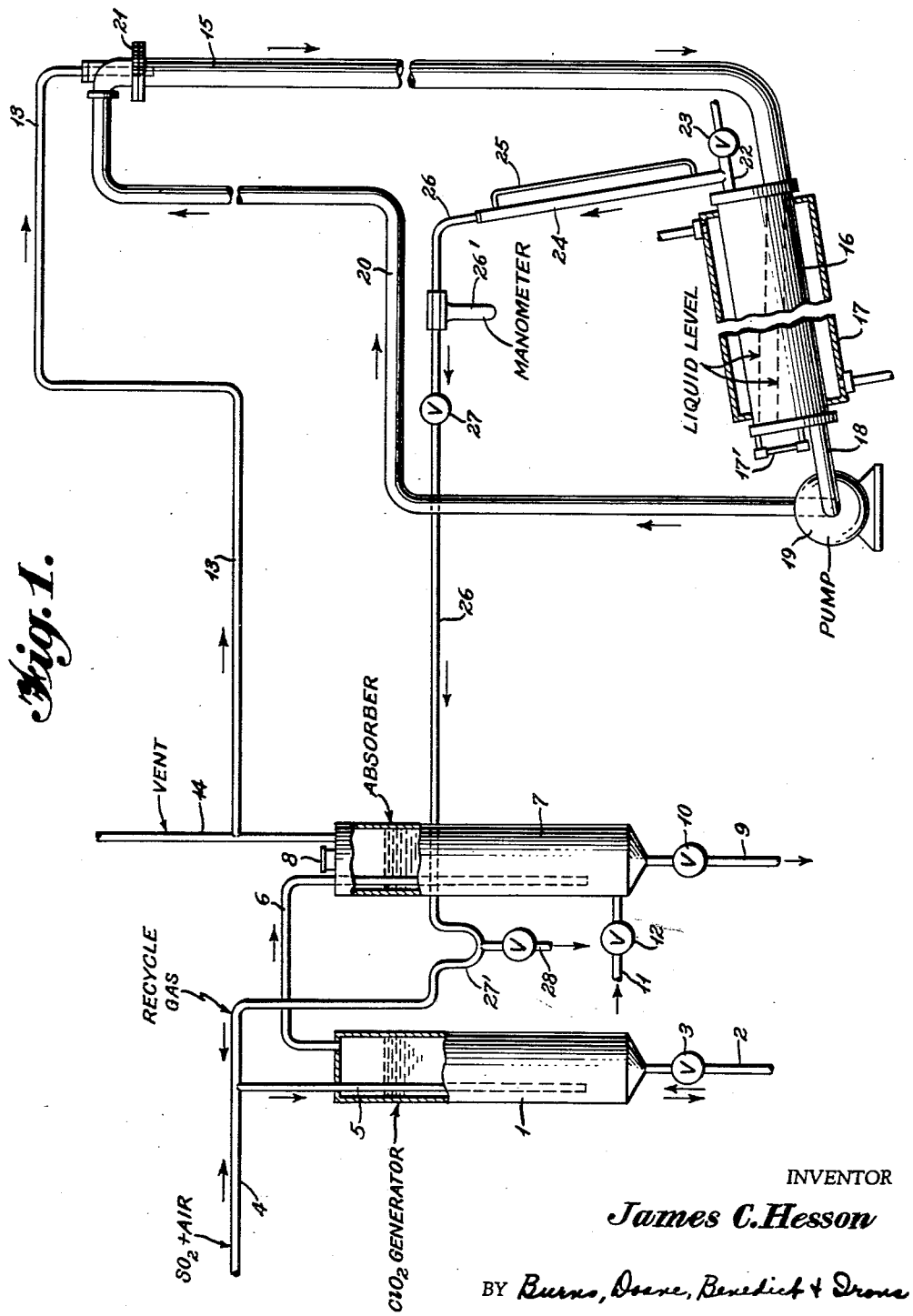

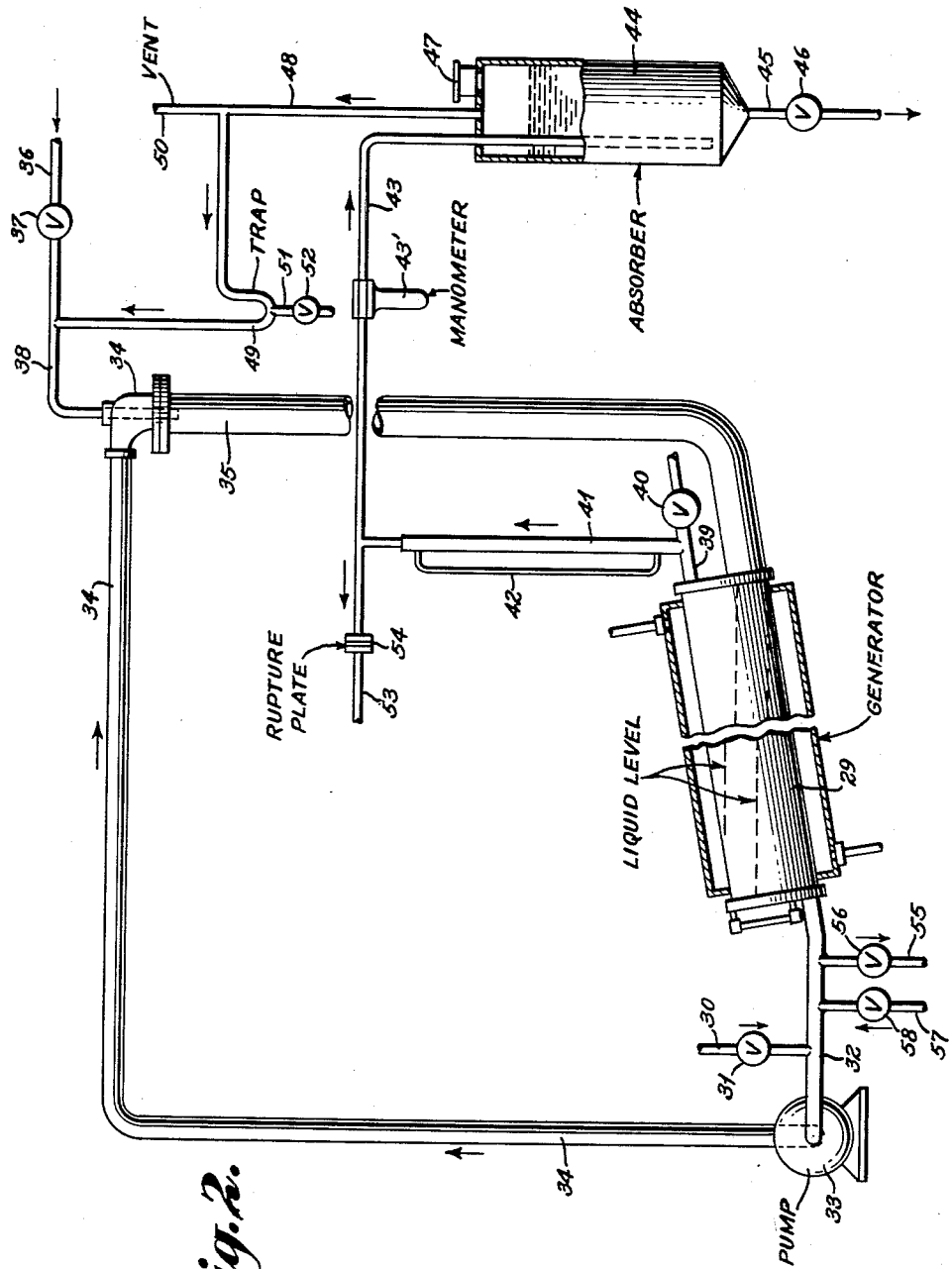

2,704,703

APPARATUS FOR MANUFACTURE OF CHLORINE DIOXIDE HYDRATE

James C. Hesson, Riverdale, Ill., assignor to Cardox Corporation, Chicago, Ill., a corporation of Illinois Application February 16, 1954, Serial No. 410,517

6 Claims. (Cl. 23—260)

This invention relates to an apparatus for the manufacture of chlorine dioxide hydrate.

In recent years chlorine dioxide has been used for a number of purposes particularly in connection with the aging and improving of flour and cereal grains and a variety of other uses, including the bleaching of fibers, paper pulp and the like, as well as the treatment of water. In a co-pending application by Williamson and Hampel, Serial No. 266,814 is described and claimed a method for the manufacture of chlorine dioxide hydrate whereby chlorine dioxide can be made at a central point of manufacture, converted to the stable hydrate and transported under refrigeration to a distant point of use. The method comprises first forming a mixture of chlorine dioxide and an inert gas, the partial pressure of the chlorine dioxide being in the range of 100 to 500 mm. of mercury, and passing the gas through water at a temperature below 15° C. and generally from about —1° to about 5° C. Unless the partial pressures are above about 100 mm. of mercury the hydrate does not form. At atmospheric pressure, the lower limit at which chlorine dioxide hydrate will form corresponds to a concentration of about 12% by volume of chlorine dioxide in the gas. As a practical matter on the commercial scale, concentrations of chlorine dioxide of about 20% to 35% by volume are used, the concentration usually being in the neighborhood of 25% chlorine dioxide in the gas. After the gas is passed through the absorber wherein the hydrate is formed, the exit gas contains approximately 12% of chlorine dioxide at atmospheric pressure, or less if higher pressures are used. If this gas is vented to the atmosphere, it not only creates a nuisance but also represents a substantial loss of chlorine dioxide. Consequently it is desirable to return the exit gas from the absorber to the chlorine dioxide generator to serve as part or all of the diluent gas.

It is one object of the present invention to provide a closed cycle apparatus, therein producing a rich mixture of chlorine dioxide in a diluent gas, absorbing part of the chlorine dioxide in water to produce the hydrate, and recycling the lean exit gas from the absorber to the chlorine dioxide generator wherein it is enriched.

Figure 1 represents a flow diagram of the process with the apparatus illustrated semi-diagrammatically. Figure 2 is another modification of the invention.

Referring to Figure 1 the apparatus comprises a chlorine dioxide generator 1. Because of the corrosive character of the chemicals employed, the vessel 1 must be of corrosion resistant material and may suitably be of Duriron. It is a generally cylindrical vessel and is provided with a line 2 and valve 3 for the introduction and removal of chemicals. As illustrated herein the chlorine dioxide is produced by the method described in U. S. Reissue Patent 23,111 wherein sulfur dioxide is reacted with a chlorate such as sodium chlorate in an aqueous solution acidified with sulfuric acid or phosphoric acid. The solution of the chlorate acidified with sulfuric acid for example, may be introduced through line 2 to a level generally indicated by the dotted lines. The reaction between sulfur dioxide and the chlorate results in the formation of sodium sulfate which builds up in the solution. A portion of the solution may be removed through line 2 from time to time, sodium sulfate may be removed therefrom by crystallization as sodium sulfate or sodium bisulfate, and the mother liquor returned to the generator. The solution can be removed continuously and additional chemicals added continuously by providing a second line in generator 1 as will be evident. Sulfur dioxide which may be mixed with air or other inert gas is added through line 4 and line 5 which extend to a point near the bottom of the generator. The sulfur dioxide reacts with the chlorate to produce chlorine dioxide which mixes with the air and is swept from the generator through line 6 which extends into the absorber 7. The absorber 7 may be made of any corrosion resistant material and contains water which becomes saturated with chlorine dioxide. As previously mentioned, the proportion of sulfur dioxide to inert gas is generally about one to four, although this may vary within the limits set forth in the above mentioned application Serial No. 266,814. The temperature in the generator 1 is generally maintained at about 30–50° C. although this may vary considerably. At about 40° C. the reaction proceeds smoothly and concentrations of chlorine dioxide of 20% to 30% can be produced with little likelihood of explosions. In practice, the generator is equipped with pressure release means such as rupture plates to avoid damage to the vessel in the event a gas explosion should occur. The liquid level is maintained relatively high so as to keep the amount of gas in the generator at as low a value as is practical.

The vessel 7 is provided with means for introducing ice, this being shown at 8. This may be a manhole provided with a cover which can be removed from time to time and the ice added in the form of chips. This maintains a temperature of about —1° to about +1° C. Other means of introducing the ice may be employed as will be obvious. Likewise the absorber 7 may be equipped with a jacket through which water or brine may be circulated or with cooling coils, or may be refrigerated in any suitable manner to maintain the low temperatures employed in the absorption step.

The chlorine dioxide hydrate accumulates in the absorber and may be removed from time to time through line 9 and valve 10 as a slurry. Concentrated aqueous solution of chlorine dioxide is drained from the crystals and may be returned to the absorber together with make-up water through line 11 and valve 12. The absorber gas from which a large proportion of the chlorine dioxide has been absorbed in the course of forming the hydrate is removed from the absorber through line 12 which is attached to a vent line 14 which may lead to a stack. When operating at atmospheric pressure the vent line is open to the atmosphere. Line 13 extends into the top of fall-pipe 15 which, during operation, is full of water mixed with air. The fall-pipe extends about 30 feet or more above the absorber and generator to provide a sufficient hydraulic head to provide the required compression.

As will be explained below the re-cycling is self-regulating, hence there is no especial criticality in the heads involved. For instance, if it is assumed that the dip tube in the absorber extends 5 feet below the liquid level (spec. gr. about 1) which gives a hydraulic head of 5 feet of water, and if the dip tube in the generator extends 5 feet below the acid solution level (specific gravity about 1.5) which gives a hydraulic head of 7.5 feet of water, the total hydraulic head for those two items is thus 12.5 feet of water. The head loss due to friction in the piping varies with the flow but assume it is 1 foot of water, thus the total head is 13.5 feet of water. In order to develop this head, the length of the pipe 15, times the specific gravity of the mixture of water and gas (air) must be 13.5. Since the specific gravity of this mixture is less than 1, depending upon the quantity of air in the mixture, pipe 15 must be at least 13.5 feet long to cause gas recycling. The system regulates itself by drawing gas in through pipe 13 at a rate such that the specific gravity of the mixture in pipe 15 is just sufficient to create enough pressure to overcome the total head required. In order to obtain a reasonable recycle rate the pipe 15 should be about twice as long as the head required for recycling. In other words, for a head of 13.5 feet it should be at least about 25 or 30 feet long. Pipe 15 connects with a compression chamber 16 which is shown as an elongated, horizontally inclined vessel. It is not necessary that the compression chamber be inclined as shown. However, it is necessary that the liquid level during operation be above the pump inlet pipe 18 so that the pump does not draw in the (gaseous medium) air. By inclining the chamber as shown it is evident that a smaller compression chamber can be used since the pipe 18 is covered by liquid with a smaller chamber even though the liquid level varies. The principle is somewhat like creating a low spot for a drain in a vessel. A vertical vessel could be used, however, the requirements for the vessel are (a) pipe 18 must be covered by liquid, (b) a large surface between the air and liquid is desired to permit the air to evolve from or leave the air-liquid mixture coming in through pipe 15, (c) the distance from the inlet pipe 15 and outlet pipe 18 should be as large as possible to permit as much time as possible for the separation of the air as the liquid flows from pipe 15 to pipe 18, (d) a horizontal vessel makes connection of pipes 15 and 18 simple.

It may be provided with a jacket 17 for controlling the temperature and a sight glass 17' whereby the liquid level in the vessel may be observed. This vessel contains an aqueous solution of chlorine dioxide. The water from the vessel is pumped through line 18, pump 19 and line 20 to the top of the fall tower 15. Line 20 is smaller in diameter than line 15 and is joined thereto by flange 21. Line 13 extends coaxially through line 20 to a point just beyond the point at which lines 20 and 15 are joined, thus forming a gas injector whereby gas is drawn through line 13 due to the falling water in pipe 15, and is passed into chamber 16 wherein it separates from the liquid. The liquid level may vary somewhat as shown by the pairs of dotted lines but must always cover the outlet to pipe 18. It will be under a pressure approximately equal to the difference in the hydraulic head in pipe 15 and the heads in the generator and absorber.

A gas line 22 leads from the top of vessel 16 and may be equipped with a valve 23 through which water can be added to fill the system. A pipe 24 equipped with a sight glass 25 extends for several feet above the vessel 16 and is connected to line 22. Line 26 in which is a manometer 26, and a valve 27, leads to line 5 in the generator.

To start the operation, water is pumped into the vessel 16 through line 22 and valve 23 to fill the compressor system just described and shown on the right hand side of the drawing. Vessel 16 and pipe 15 are filled. (It is not necessary to close valve 27 although this valve could be closed.) Air is bled off through line 26 and valve 28. Water is added until a substantial water level appears in pipe 24, so as to provide the water necessary to fill pipe 20 when the pump is started, and leave a relatively small vapor space in vessel 16 as shown by the dotted lines. It is necessary that this water level always be above the intake pipe 18 to pump 19.

A chlorate-acid solution is introduced to generator 1, and water and water ice or cold water is introduced into absorber 7. The pump 19 is started. The water level in pipe 24 drops as pipes 20 and then 15 are filled. Air to form the pocket in vessel 16 as indicated by the liquid level line in the drawing can be admitted through valve 28 and line 26 or it will be automatically drawn in through vent 14, thence through lines 13 and 15 to bubble up through the water in 16. The falling water in pipe 15 then sucks gas through line 13 and carries it through pipe 15 into vessel 16 where it separates in the pocket. As the air is carried down pipe 15 the pressure on it increases because of the increasing head of the mixture of water and air above it in the pipe 15. The air in the pocket in vessel 16 is thus under a pressure approximately equal ot the head of the mixture of air and water in pipe 15. As soon as the pressure of the air in the pocket becomes equal to the combined hydraulic heads in the generator and absorber, air starts to flow through pipes 26 and 5 into the generator and then through pipe 13. The system becomes self-regulating. If the liquid levels in the generator or absorber change, for instance increase, requiring a higher pressure of the air, less air is sucked in through pipe 13 and the amount of air in the mixture of air and water in pipe 15 decreases. This causes an increase in density of the mixture of air and water in pipe 15, thus increasing the air pressure in the pocket in vessel 16. Likewise any change requiring less air pressure causes more air to be sucked from pipe 13 with consequent lowering of the pressure of the air in the pocket. As soon as air circulation has been established sulfur dioxide alone (or with a small amount of air if desired) can be admitted to the generator through pipe 4.

If due to occasional fluctuations in operation too much chlorine dioxide is produced for the compressor system to handle, the excess will pass through the vent. If more air is required this will be sucked in through the vent 14. Other sequences can be used to start the apparatus, for instance, sulfur dioxide and air can be admitted first and the air later shut off or reduced as the re-cycling is established.

The trap 27' is provided with a valved line 28 by which any liquid accumulating in line 26 can be drained from the system. The line 26 may slope toward the drain so that there will be no substantial amount of liquid accumulation in the line which might interfere with the operation. Any type of manometer 26' may be used. The manometer may be provided with electrical contacts in a known manner which connect a solenoid valve on the sulfur dioxide supply line so as to cut off the supply of sulfur dioxide in the event of trouble in the compressor system, such as a pump failure, whereby the gas was not recirculated. This would automatically prevent any build-up of explosive chlorine dioxide in the generator.

The fall-pipe 24 may be made of polyethylene or other suitable material, and the pump is of Duriron. Lines 26, 6 and 13 may be of a suitable resistant material such as polyethylene or Saran. The portion of line 13 extending into line 20 may be of polyethylene, Duriron, Hastaloy or other suitable corrosion resistant material.

In the reaction between sulfur dioxide and sodium chlorate the principal product is chlorine dioxide but there is always a certain proportion of chlorine formed. Thus, under one set of conditions the gas emerging from the generator may contain about 30% chlorine dioxide and about 6% chlorine. The chlorine is not absorbed to any substantial extent in the absorber. Consequently it might be expected that there would be a build-up of chlorine concentration if the lean absorber gases were recycled to the generator. However, actual operation of the plant showed that this was not the case. In a typical commercial operation wherein the lean absorber gases were recycled in the system represented by Figure 1, the exit gas from the generator was found to contain about 24% of chlorine dioxide and 1% of chlorine, these figures remaining constant as the operation was continued. The fact that chlorine does not build up in the system is an unexpected result which improves the economies of the process since there is no waste of reagent in producing the undesired chlorine and since it obviated any need for bleeding off a portion of the recycled gases and replacing it with air.

In one typical operation of a commercial plant represented by Figure 1 the capacity of the plant was found to be about 450 pounds per day of chlorine dioxide hydrate. This amounts to about 70 pounds per day of chlorine dioxide recovered as the hydrate. Before installing the recycle operation of this invention the yield of the same plant was found to be about 270 pounds of hydrate per day or about 45 pounds of chlorine dioxide recovered as the hydrate, a substantial amount of chlorine dioxide being lost in the exit gases.

Referring to Figure 2, another modification of the apparatus will be described. The plant comprises the tilted compression chamber 29 which is similar in construction to vessel 16 shown in Figure 1. In this modification chamber 29 serves as the chlorine dioxide generator. The liquid in the vessel is a solution of, for example, sodium chlorate, sulfuric acid and water. The solution may be introduced into the system through line 30 and valve 31. This line may also be used for adding make-up chemicals. Line 30 joins with line 32 leading from chamber 29 to pump 33. The liquid is pumped through line 34 to the eductor at the top of the fall-pipe 35 which is similar in structure to lines 13 and 15 described in connection with Figure 1. Sulfur dioxide is introduced through line 36 and valve 37 and line 38, which, as in the modification described in Figure 1, extends through line 34 just past the juncture of lines 34 and fall-pipe 35, the solution falling through pipe 35 carrying the sulfur dioxide with it into generator-chamber 29. Chlorine dioxide is generated in both the fall-pipe and chamber 29 in which it separates from the solution as indicated by the dotted line. The gas containing chlorine dioxide of 100–500 mm. partial pressure, passes through pipe 39 (which may be equipped with a valve 40), and pipe 41 equipped with sight glass 42. The gas then passes through line 43 into the absorber 44 wherein chlorine dioxide hydrate is formed. A manometer 43' is provided in line 43, and as in the case of the apparatus shown in Figure 1, may be provided with electrical contacts to control a solenoid type valve to automatically shut off the sulfur dioxide supply in the event the recycle rate becomes too low or too high. The sulfur dioxide supply is controlled by valve 37, so as to maintain a constant chlorine dioxide concentration in the gases passing to the absorber. Other suitable types of control apparatus may be used.

The hydrate may be withdrawn through line 45 and valve 46. Ice may be introduced as required through port 47. The lean absorber gases pass through line 48, trap 49 and dilute the sulfur dioxide passing through line 38 into the eductor. As in the case of the modification shown in Figure 1 a vent line 50 connects with line 48. The trap 49 may be drained through line 51 and valve 52 in case there is an accumulation of liquid in the line. Line 53 is provided with a rupture plate 54 should an explosion occur in vessel 29.

Line 55 and valve 56 are provided for continuously or periodically withdrawing a portion of the solution from the system for purposes of crystallizing out the sodium sulfate formed in the reaction. The mother liquor from this operation may be returned through line 57 and valve 58. This liquor may be fortified with sodium chlorate or other chlorate as required before being returned to the system.

The advantage of this modification lies in the fact that not only is the system self-contained but the hydraulic head which exists in the generator 1 of Figure 1 is eliminated. The apparatus is simplified and is consequently cheaper to build and operate.

Although the operation has been described in connection with reacting sulfur dioxide and a chlorate, it is evident that it can be used with other reactants in which a gas reacts with a solution of a reagent to produce a desired gas mixed with a gaseous diluent and in which the resultant mixture is partially absorbed or otherwise removed, but in which recirculation of the lean absorber gases is desirable. For example, chlorine may be reacted with an aqueous solution of a chlorite such as sodium chlorite to produce chlorine dioxide. In certain types of solvent recovery a solvent is evaporated from a material by passing a heated stream of inert gas through it. The solvent is then removed from the inert gas by cooling to condense or by absorbing it from the inert gas. The inert gas is then recycled to evaporate more solvent. In this case the falling water compressor might be used. A liquid other than water, say oil, etc., would be used.

The apparatus could be operated at superatmospheric pressure by closing the vent on pipe 14 in Figure 1 or the vent on pipe 50 in Figure 2, and then increasing the pressure by adding air with sulfur dioxide until the pressure reached the desired value. If the pressure went too high it could be relieved by manually or automatically venting some of the gas. If the pressure went too low it would be necessary to add more air. By continually adding a small amount of air and by automatically venting by a relief valve (or by placing the vent pipe under a liquid head) any desired pressure could be maintained.

The invention is not to be considered as limited to the exact structures shown but embraces other modifications apparent to one skilled in the art.

I claim as my invention:

1. An apparatus for producing chlorine dioxide hydrate which comprises an absorber, a falling-water gas compressor including an elevated fall-pipe, a compression chamber adapted to be partially filled with liquid and partially filled with gas, means connecting the fall-pipe to said chamber, means for withdrawing liquid from the chamber including a pump and a first conduit from said pump to the top of the fall-pipe; means including a second conduit for conducting gas from the chamber to the absorber, a third conduit from the top of the absorber to the top of the fall-pipe, an eductor at the top of the fall-pipe whereby liquid introduced through the first conduit draws gas from the absorber into the fall-pipe, and means for enriching the gas which has passed from the absorber to the chamber via the fall-pipe, with chlorine dioxide gas.

2. The apparatus of claim 1 comprising means for introducing into, and maintaining gas-generating reactants in said chamber and said fall-pipe.

3. The apparatus of claim 1 which comprises means for filling the fall-pipe and the first conduit leading from said pump, and for partially filling said chamber with a reactant liquid, and means for introducing a gas into said chamber, which gas is reactive with the reactant liquid to form chlorine dioxide.

4. An apparatus for producing chlorine dioxide hydrate which comprises an absorber, a falling-water gas compressor including an elevated fall-pipe, a compression chamber adapted to be partially filled with liquid and partially filled with gas, means connecting the fall-pipe to said chamber, means for withdrawing liquid from the chamber including a pump and a first conduit from said pump to the top of the fall-pipe; a chlorine dioxide generator, a second conduit from the top of the chamber to said chlorine dioxide generator, a third conduit from said generator to a point near the bottom of said absorber, a fourth conduit from the top of said absorber to the top of said fall-pipe, an eductor at the top of said fall-pipe connected with the first conduit and the fourth conduit whereby gas from the absorber is drawn into said fall-pipe by the liquid.

5. An apparatus for producing chlorine dioxide hydrate which comprises a generator, means for introducing a diluent gas into the generator, an absorber, conduit means from the generator to the absorber, conduit means for removing absorber gases from the absorber and passing them to a compressor, said compressor comprising an elevated fall-pipe, a compression chamber, means for connecting the fall-pipe to the lower part of the chamber, means including a pump for withdrawing liquid from the chamber, conduit means from the pump connecting coaxially with the top of the fall-pipe, an injector pipe at the top of the fall-pipe coaxial therewith, said injector pipe connected with the absorber gas conduit, and a conduit connecting the upper end of the chamber with the generator to convey compressed gases to said generator whereby they are enriched with chlorine dioxide gas.

6. An apparatus for producing chlorine dioxide hydrate which comprises an inclined generator adapted to be partially filled with liquid and partially filled with gas, a conduit from the depressed end of the generator, a pump to which the conduit connects, a conduit from the pump, a fall-pipe of larger diameter than the last named conduit and connected coaxially to it at the top, said fall-pipe being connected to the lower part of the elevated end of the generator, an eductor pipe coaxial with the fall-pipe, a gas outlet pipe connected at the upper part of the elevated end of the generator, a gas absorber wherein said hydrate is formed, a conduit connecting the gas outlet pipe and the absorber and extending into the absorber to a point adjacent the bottom, an absorber gas conduit connecting the vapor space in the absorber with the eductor pipe, and means for introducing a solution of chemicals and gases reactant therewith to generate chlorine dioxide into the generator.

No references cited.